(12) United States Patent
Krebs et al.

(10) Patent No.: US 11,449,759 B2
(45) Date of Patent: Sep. 20, 2022

(54) MEDICAL IMAGING DIFFEOMORPHIC REGISTRATION BASED ON MACHINE LEARNING

(71) Applicants: Siemens Healthcare GmbH, Erlangen (DE); Institut National de Recherche en Informatique et en Automatique, Le Chesnay (FR)

(72) Inventors: Julian Krebs, Moers (DE); Herve Delingette, La Colle sur Loup (FR); Nicholas Ayache, Nice (FR); Tommaso Mansi, Plainsboro, NJ (US); Shun Miao, Princeton, NJ (US)

(73) Assignees: Siemens Heathcare GmbH, Erlangen (DE); Institut National de Recherche en Informatique et en Automatique, Le Chesnay (FR)

( * ) Notice: Subject to any disclaimer, the term of this patent is extended or adjusted under 35 U.S.C. 154(b) by 337 days.

(21) Appl. No.: 16/233,174

(22) Filed: Dec. 27, 2018

(65) Prior Publication Data

US 2019/0205766 A1     Jul. 4, 2019

Related U.S. Application Data

(60) Provisional application No. 62/613,250, filed on Jan. 3, 2018.

(51) Int. Cl.
*G06N 3/08*   (2006.01)
*G06N 3/04*   (2006.01)
*G06N 20/20*  (2019.01)
*G06T 7/00*   (2017.01)
(Continued)

(52) U.S. Cl.
CPC ........... *G06N 3/088* (2013.01); *G06K 9/6256* (2013.01); *G06N 3/0454* (2013.01); *G06N 20/20* (2019.01); *G06T 7/0012* (2013.01); *G06T 7/33* (2017.01); *G06T 2207/10072* (2013.01); *G06T 2207/10116* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 10,387,765 B2 *   8/2019   Mailhe ................... G06N 3/084
10,699,410 B2 *   6/2020   Pheiffer ................ G06T 7/0016
(Continued)

OTHER PUBLICATIONS

Liya Zhao, Kebin Jia, "Deep Adaptive Log-Demons: Diffeomorphic Image Registration with Very Large Deformations", Computational and Mathematical Methods in Medicine, vol. 2015, Article ID 836202, 16 pages, 2015. https://doi.org/10.1155/2015/836202 (Year: 2015).*

(Continued)

*Primary Examiner* — Andrae S Allison (57) ABSTRACT

For registration of medical images with deep learning, a neural network is designed to include a diffeomorphic layer in the architecture. The network may be trained using supervised or unsupervised approaches. By enforcing the diffeomorphic characteristic in the architecture of the network, the training of the network and application of the learned network may provide for more regularized and realistic registration.

17 Claims, 4 Drawing Sheets

(51) Int. Cl.
    G06K 9/62      (2006.01)
    G06T 7/33      (2017.01)

(56) References Cited

U.S. PATENT DOCUMENTS

| | | | | |
|---|---|---|---|---|
| 2015/0178938 A1* | 6/2015 | Gorman, III | ............ | G06T 7/143 382/131 |
| 2017/0007148 A1* | 1/2017 | Kaditz | ................. | A61B 5/055 |
| 2017/0285122 A1* | 10/2017 | Kaditz | ................. | G01R 33/448 |
| 2017/0337682 A1* | 11/2017 | Liao | ......................... | G06T 7/30 |
| 2018/0089530 A1* | 3/2018 | Liu | ....................... | G06T 7/0012 |
| 2018/0096478 A1* | 4/2018 | Zhang | ................... | G16H 50/50 |
| 2020/0090345 A1* | 3/2020 | Krebs | .................... | G06T 7/248 |

OTHER PUBLICATIONS

Stefan Sommer, François Lauze, Mads Nielsen, Xavier Pennec. Sparse Multi-Scale Diffeomorphic Registration: the Kernel Bundle Framework. Journal of Mathematical Imaging and Vision, Springer Verlag, 2013, 46 (3), pp. 292-308. ff10.1007/s10851-012-0409-0ff. ffhal-00813868f (Year: 2013).*

Liu et al, A Robust and Efficient Doubly Regularized Metric Learning Approach, Comput Vis ECCV. 2012 ; 7575: 646-659. doi: 10.1007/978-3-642-33765-9_46. (Year: 2012).*

Yang, Xiao, et al. "Quicksilver: Fast predictive image registration—a deep learning approach." NeuroImage 158 (2017): 378-396. (Year: 2017).*

Morra, Jonathan, et al. "Machine learning for brain image segmentation." Biomedical Image Analysis and Machine Learning Technologies: Applications and Techniques. IGI Global, 2010. 102-126. (Year: 2010).*

Dalca, Adrian V., et al. "Unsupervised learning for fast probabilistic diffeomorphic registration." International Conference on Medical Image Computing and Computer-Assisted Intervention. Springer, Cham, 2018. (Year: 2018).*

Dalca, A.V., Balakrishnan, G., Guttag, J., Sabuncu, M.R. (2018). Unsupervised Learning for Fast Probabilistic Diffeomorphic Registration. In: Frangi, A., Schnabel, J., Davatzikos, C., Alberola-López, C., Fichtinger, G. (eds) Medical Image Computing and Computer Assisted Intervention—MICCAI 2018. (Year: 2018).*

Arsigny, Vincent, et al. "A log-euclidean framework for statistics on diffeomorphisms." International Conference on Medical Image Computing and Computer-Assisted Intervention. Springer, Berlin, Heidelberg, 2006.

Balakrishnan, Guha, et al. "An Unsupervised Learning Model for Deformable Medical Image Registration." Proceedings of the IEEE Conference on Computer Vision and Pattern Recognition. 2018.

Cao, Xiaohuan, et al. "Deformable image registration based on similarity-steered CNN regression." International Conference on Medical Image Computing and Computer-Assisted Intervention. Springer, Cham, 2017.

Dalca, Adrian V., et al. "Unsupervised Learning for Fast Probabilistic Diffeomorphic Registration." arXiv preprint arXiv:1805.04605 (2018).

De Vos, Bob D., et al. "End-to-end unsupervised deformable image registration with a convolutional neural network." Deep Learning in Medical Image Analysis and Multimodal Learning for Clinical Decision Support. Springer, Cham, 2017. 204-212.

Hu, Yipeng, et al. "Label-driven weakly-supervised learning for multimodal deformarle image registration." Biomedical Imaging (ISBI 2018), 2018 IEEE 15th International Symposium on. IEEE, 2018.

Jaderberg, Max, Karen Simonyan, and Andrew Zisserman. "Spatial transformer networks." Advances in neural information processing systems. 2015.

Krebs, Julian, et al. "Learning Structured Deformations using Diffeomorphic Registration." arXiv preprint arXiv:1804.07172 (Sep. 2018).

Rohé, Marc-Michel, et al. "SVF-Net: Learning deformable image registration using shape matching." International Conference on Medical Image Computing and Computer-Assisted Intervention. Springer, Cham, 2017.

Ronneberger, Olaf, Philipp Fischer, and Thomas Brox. "U-net: Convolutional networks for biomedical image segmentation." International Conference on Medical image computing and computer-assisted intervention. Springer, Cham, 2015.

Shan, Siyuan, et al. "Unsupervised end-to-end learning for deformable medical image registration." arXiv preprint arXiv:1711.08608 (2017).

Sokooti, Hessam, et al. "Nonrigid image registration using multi-scale 3D convolutional neural networks." International Conference on Medical Image Computing and Computer-Assisted Intervention. Springer, Cham, 2017.

Vercauteren, Tom, et al. "Diffeomorphic demons: Efficient non-parametric image registration." NeuroImage 45.1 (2009): p. 1-30.

Yang, Xiao, et al. "Quicksilver: Fast predictive image registration—a deep learning approach." NeuroImage 158 (2017): 378-396.

* cited by examiner

MEDICAL IMAGING DIFFEOMORPHIC REGISTRATION BASED ON MACHINE LEARNING

RELATED APPLICATIONS

The present patent document claims the benefit of the filing date under 35 U.S.C. § 119(e) of Provisional U.S. Patent Application Ser. No. 62/613,250, filed Jan. 3, 2018, which is hereby incorporated by reference.

BACKGROUND

The present embodiments relate to deformable registration. Deformable registration may be used in multi-modal registration for reading or radiotherapy planning, longitudinal analysis for follow-up assessment or motion compensation, atlas-based segmentation, and/or surgery planning. Registering images of the same organ or structure from different points in time and/or scans from different modalities or settings may provide important insights in tumor growth or organ function. In multi-modality imaging, jointly displaying the registered images provides a more complete visualization of the given anatomy and pathology and thus helps in diagnosis and therapy. Fast and reliable deformable registration is hence desired. Traditional variational algorithms are time-consuming, specifically designed for certain type of images, and not robust to changes in image appearance.

Deformable registration is typically achieved by minimizing an objective function between the fixed and moving image and a regularization term. Due to the ill-posed nature of the problem, various regularizers have been proposed to add prior knowledge about the desired transformations. One group of algorithms uses the mathematically well-founded concept of diffeomorphisms. Diffeomorphic transformations restrict the space of dense deformations to the subspace of bijective and invertible maps, hence guaranteeing invertibility, smoothness, and no foldings. A way to parametrize diffeomorphic deformations is through time-varying velocity fields, which are then integrated in the mechanical way to get the deformation. The subspace of stationary velocity fields has also been extensively studied, as such fields allow efficient computations.

Due to the computational expenses of the traditional methods, deep learning-based methods for image registration have been used. In supervised learning, a similarity metric is based on given ground truth deformation fields. Such ground truth data may not be available. Approximating the ground truth deformations with traditional algorithms limits the network's performance by the quality and errors of these algorithms. Synthetic deformations may not generate realistic and plausible deformations or may be restricted to mono-modal or intra-subject registration. In unsupervised learning, a pre-defined similarity metric is used as the loss function. In the unsupervised methods, results may not show significant improvements in accuracy or robustness compared to traditional methods.

SUMMARY

Systems, methods, and computer readable media are provided for registration of medical images. A neural network is designed to include a diffeomorphic layer in the architecture. The network may be trained using supervised or unsupervised approaches. By enforcing the diffeomorphic characteristic in the architecture of the network, the training of the network and application of the learned network may provide for more regularized and realistic deformation.

In a first aspect, a method is provided for registration with a medical imaging system. First and second sets of scan data representing a patient are acquired. Displacements of the registration of the scan data of the first set with the scan data of the second set are determined by input of the first and second sets of the scan data to a deep machine-learned network having a diffeomorphic layer such that the displacements output by the deep machine-learned network are diffeomorphic. An image of the patient is generated from the displacements.

In a second aspect, a medical imaging system is provided for image registration. A medical scanner is configured to generate a first image from a scan a patient. An image processor is configured to apply a machine-learned neural network to the first image and a second image. The machine-learned neural network was trained to generate a warped image using velocities estimated from the first and second images and using a diffeomorphic deformation field determined from the velocities. A display is configured to display the warped image or the velocities.

In a third aspect, a method is provided for machine training for diffeomorphic registration. A neural network arrangement is defined with an exponentiation layer. A machine trains the neural network arrangement with pairs of images as training data to determine a diffeomorphic deformation field. The neural network as trained is stored.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Robust deep diffeomorphic registration is provided. Neural network architectures are provided for diffeomorphic deformable registration. Diffeomorphic registration concepts are incorporated into a neural network architecture. The neural network is trained to estimate the diffeomorphic deformation between two images in one-shot. The framework may be trained in a supervised, unsupervised, or semi-supervised way. For unsupervised training, a differentiable similarity metric (e.g., local cross correlation) may be used as a loss function. Two images are applied to a trained neural network. A warped image, corresponding dense velocities, and/or diffeomorphic deformation field may be output from the network after one forward evaluation of the network.

Real-time, accurate and robust estimation of the dense deformation field between two images may be used for any registration application. The field has a similar or same resolution as the input images. Robustness and accuracy may be improved by using diffeomorphisms. Multi-scale concepts may provide further improvement.

Figure 1:
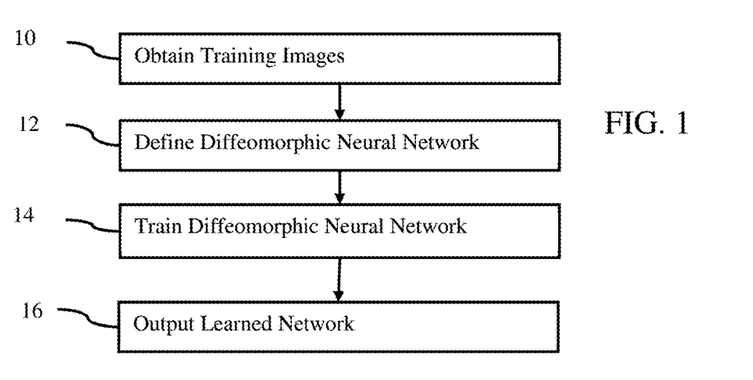
FIG. 1 is a flow chart diagram of one embodiment of a method for machine training for registration.
Figure 5:
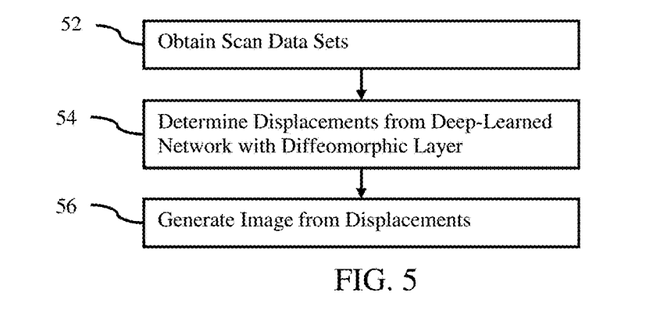
FIG. 5 is a flow chart diagram of one embodiment of a method for registration with an imaging system.

FIGS. 1 and 5 show methods for registration. The method for registration may be a method to learn how to register or may be a method for registering. FIG. 1 is directed to machine training of the network for registration. FIG. 5 is directed to application of a machine-learned network. In both cases, a machine, such as an image processor, computer, or server, implements some or all the acts. The same or different machine is used for training and application. The system of FIG. 7 implements the methods in one embodiment, but other systems may be used.

A user may select the image files for application of the learned network by the processor or select the images from which to learn features and train the network by a processor. Use of the machine allows processing large volumes (e.g., images of many pixels and/or many images) of information that may not be efficiently handled by humans, may be unrealistically handled by humans in the needed time frame, or may not even be possible by humans due to subtleties and/or timing. The machine may learn in a way different than a human to register in a way different than a human, improving registration through diversity and improving diagnosis or treatment. Use of the architecture discussed herein may make the machine operate more quickly, use less memory, and/or provide better results in application and/or training than other automated approaches or manual registration.

The methods are provided in the orders shown, but other orders may be provided. For FIG. 1, acts 12 and 14 may be performed as one act.

Additional, different or fewer acts may be provided. For example, act 16 of FIG. 1 is not provided. As another example, act 56 of FIG. 5 is not provided. In yet other examples, acts for capturing images and/or acts using detected information (e.g., quantification from a warped image) are provided.

FIG. 1 shows a method for machine training for diffeomorphic registration. A deep architecture with a diffeomorphic layer is trained, providing for accurate registration of different sets of data.

In act 10, pairs of images representing the patient at different times, from scans with different settings, and/or from scans with different modalities are obtained. In the examples below, images acquired at different times from a same scan of the patient are used as a fixed image and a moving image. The images are obtained by data transfer, capture, and/or loading from memory. Any number of pairs of images is obtained, such as tens or hundreds. The images are obtained with a same scanner or different scanners. The object or patient region as occurring in many different patients is included in the collection of images.

The images are captured using magnetic resonance (MR) scanners. For example, gradient coils, a whole-body coil, and/or local coils generate a pulse sequence in a magnetic field created by a main magnet or coil. The whole-body coil or local coils receive signals responsive to the re-orientation of molecules shifted due to the pulse sequence. In other embodiments, the images are captured using x-ray, computed tomography (CT), fluoroscopy, angiography, ultrasound, positron emission tomography (PET), or single photon emission computed tomography (SPECT).

The obtained images may be scan data to be used to generate an image on a display, such as a medical image being scan data from medical imaging. The obtained images may be from data being processed to generate an image, data formatted for display, or data that has been used to display. Scan data may be data with no or some image processing. For example, a displayed image may represent scan data after image processing. As another example, k-space data reconstructed to an object domain by a Fourier process without other filtering or change may be image data.

The images represent volumes. Three-dimensional datasets are obtained. In alternative embodiments, two-dimensional datasets representing planes are obtained.

The obtained image pairs are examples for deformable registration. The examples may be from multi-modal registration for reading or radiotherapy planning, longitudinal analysis for follow-up assessment or motion compensation, atlas-based segmentation, motion tracking through a sequence, and/or surgery planning. The pairs of images are of the same organ from different points in time and/or scans from different modalities or settings.

The medical images are used for training in act 14. The medical images may be used as received or may be pre-processed. In one embodiment of pre-processing, the received images are normalized. Since different settings, imaging systems, patients being scanned, and/or other variations in acquiring images may result in different offsets and/or dynamic ranges, normalization may result in more uniform representation. Any normalization may be used, such as setting a maximum value to 1 with all other values linearly scaled between 0 and 1. Each volumetric scan or medical image is individually normalized. In other examples, background is removed from the images.

The training data (e.g., images) includes ground truth for supervised training. The training data includes a ground truth indication of the deformation between the images. The ground truth indication is a deformation field or warped image relating the images of each pair. For unsupervised training, the ground truth is not provided. The deformation field and/or warped image to be generated based on the input pair of images is not provided.

In act 12, a neural network (e.g., deep learning) arrangement is defined. The definition is by configuration or programming of the learning. The number of layers or units, type of learning, and other characteristics of the network are controlled by the programmer or user. In other embodiments, one or more aspects (e.g., number of nodes, number of layers or units, or type of learning) are defined and selected by the machine during the learning.

Deep architectures include convolutional neural network (CNN) or deep belief nets (DBN), but other deep networks may be used. CNN learns feed-forward mapping functions while DBN learns a generative model of data. In addition, CNN uses shared weights for all local regions while DBN is a fully connected network (i.e., having different weights for all regions of an image). The training of CNN is entirely discriminative through back-propagation. DBN, on the other hand, employs the layer-wise unsupervised training (e.g., pre-training) followed by the discriminative refinement with back-propagation if necessary. In one embodiment, a CNN, such as a fully convolutional neural network, is used.

The neural network is defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous or subsequent layer or unit.

Rather than pre-programming the features and trying to relate the features to attributes, the deep architecture is defined to learn the features at different levels of abstraction. The features are learned to reconstruct lower level features (i.e., features at a more abstract or compressed level). For example, features for reconstructing an image are learned. For a next unit, features for reconstructing the features of the previous unit are learned, providing more abstraction. Each node of the unit represents a feature. Different units are provided for learning different features.

Figure 2:
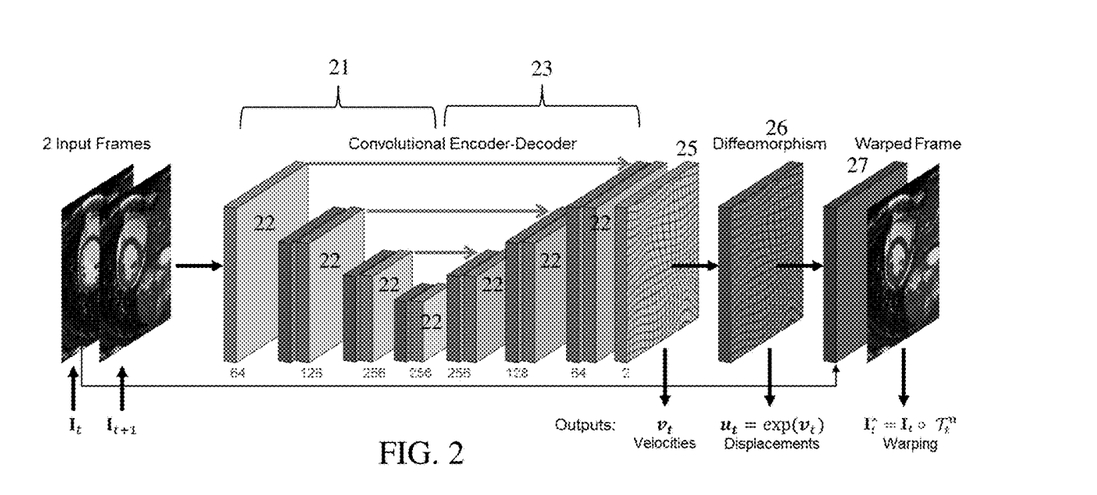
FIGS. 2 and 3 illustrate example neural network architectures using a diffeomorphic layer.

Within a unit or layer, any number of nodes is provided. For example, 100 nodes are provided. A different number of nodes may be provided for different units or layers. Later or subsequent units may have more, fewer, or the same number of nodes. In general, for convolution, subsequent units have more abstraction. For example, the first unit provides features from the image, such as one node or feature being a line found in the image. The next unit combines lines, so that one of the nodes is a corner. The next unit may combine features (e.g., the corner and length of lines) from a previous unit so that the node provides a shape indication. In the example of FIG. 2, each layer or group of layers 22 generically represents a plurality of nodes. For transposed-convolution, the level of abstraction reverses. Each unit or layer 22 reduces the level of abstraction or compression.

The features of the nodes are learned by the machine using any building blocks. For example, auto-encoder (AE) or restricted Boltzmann machine (RBM) approaches are used. AE transforms data linearly, and then applies a non-linear rectification, like a sigmoid function. The objective function of AE is the expected mean square error between the input image and reconstructed images using the learned features. AE may be trained using stochastic gradient descent or other approach to learn, by a machine, the features leading to the best reconstruction. The objective function of RBM is an energy function. Exact computation of the likelihood term associated with RBM is intractable. Therefore, an approximate algorithm, such as contrastive-divergence based on k-step Gibb sampling or other, is used to train the RBM to reconstruct the image from features.

Training of AE or RBM is prone to over-fitting for high-dimensional input data. Sparsity or denoising techniques (e.g., sparse denoising AE (SDAE)) are employed to constrain the freedom of parameters and force learning of interesting structures within the data. Enforcing sparsity within hidden layers (i.e., only a small number of units in hidden layers are activated at one time) may also regularize the network. In other embodiments, at least one unit is a convolution with ReLU activation or is a batch normalization with a ReLU activation followed by a convolution layer (BN+LeakyRU+convolution). Different units may be of the same or different type.

Any neural network architecture may be used. The architecture is the arrangement of layers for the network. In one embodiment for registration, a convolutional-transposed-convolutional network is used. One segment of layers or units applies convolution to increase abstractness or compression. The most abstract feature values are then output to another segment. The other segment of layers or units then applies transposed-convolution to decrease abstractness or compression, resulting in outputting of a velocity or deformation by location. In a further embodiment, the neural network is a U-net. An encoder (convolutional) and decoder (transposed-convolutional) network forms a "U" shape with one vertical being encoding, another vertical being decoding, and the connection between being passing features at a greatest level of compression or abstractness from the encoder to the decoder. Any now known or later developed U-net architectures may be used. Other fully convolutional networks may be used.

The U-net may include skip connections, such as passing values for features at any level of abstractness from the encoder to the corresponding level of the decoder. In FIG. 2, these skip connections are shown by the horizontal arrows from layers 22 of the encoder 21 to the layers 22 of the decoder 23. Additional, different, fewer, or no skip connections are provided in other embodiments.

The neural network arrangement is defined to include an exponentiation layer. One or more layers for diffeomorphic operations are included in the network to be used for training. The diffeomorphic operations may be defined operations to be performed on input data, resulting in output from the layer based on a mathematical function. In alternative embodiments, one or more characteristics (e.g., weight, applied function, and/or connections) for the diffeomorphic operation are to be learned.

Figure 3:
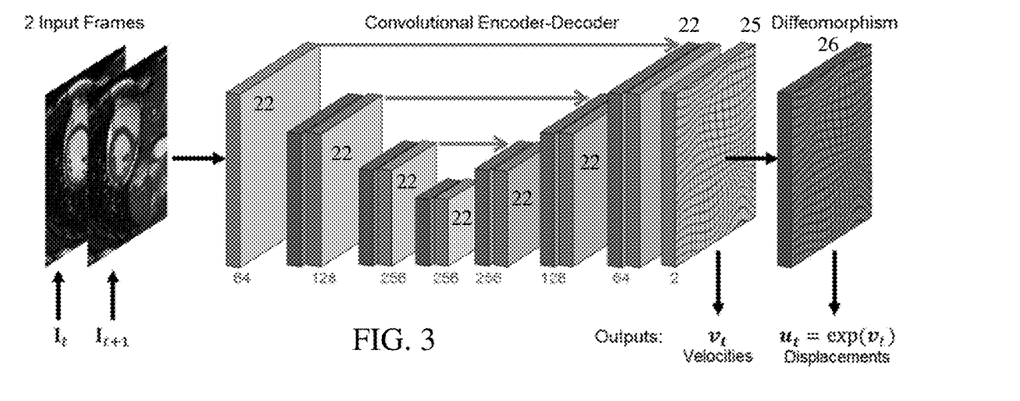

FIG. 2 shows one embodiment of a neural network architecture defined to include a diffeomorphic layer 26. FIG. 2 shows an example architecture for unsupervised training. FIG. 3 shows an example architecture for supervised training. Two input images I from different times t are input. For training, many examples of these pairs of images are input.

The encoder 21 and the decoder 23 from a fully-convolutional encoder-decoder neural network with skip connections. For example, a U-net, U-Net-like, image-to-image, or another generative network is used. The encoder 21 and decoder 23 includes layers 22. The layers 22 include a convolutional, max-pooling, batch normalization and drop-out, and/or other layers. For example, the light gray layers represent convolutional operations, the dark gray layers represent max-pooling layers, and the medium gray layers represent up-sampling layers. Additional, different, or more layers 22, types of layers, or arrangements for the encoder 21 and/or decoder 23 may be used.

The output of the decoder 23 is a velocity field. A velocity is generated for each location (e.g., pixel or voxel) by or as the velocity layer 25. The velocity layer 25 may be a convolution or pooling layer. Other layer operations may be included. Additional, different, or fewer layers may be provided to output the velocity field.

The architecture is defined to include another layer and corresponding output. The diffeomorphism layer 26 outputs displacements from the input of velocities. The diffeomorphism layer 26 is a differentiable exponentiation or integration layer to integrate velocity fields into deformation fields. Any parameterization of the diffeomorphic transformation may be used. In one embodiment, the layer 26 parametrizes diffeomorphic transformation as stationary velocity fields (SVF) in which the deformation field is computed by exponentiation of the velocities:

$$u(x)=\exp(v(x))$$

where x is the spatial vector, u is the displacement, and v is the velocity. Other embodiments are possible, such as where velocities are time varying and integrated over time.

One embodiment to compute the exponential is the scaling and squaring algorithm. This approach is represented as:

---

Algorithm 1 Computing the transformation $\phi$ = exp (v) parameterized by a SVF v: Scaling and Squaring for the Lie group exponential.

---

1. Scaling step.
Choose N so that $2^{-N}$ v is "small".
2. Compute a first approximation of $\phi_0 \leftarrow \exp(2^{-N} v) \approx \text{id} + 2^{-N} v$
3. Squaring step.
For k = 1 to N do $\phi_k \leftarrow \phi_{k-1} \circ \phi_{k-1}$

---

N is an index, such as an integer greater than 1. The layer 26 is implemented as a differentiable version of the scaling and squaring algorithm. First, the scaling step applies a factor N that may be precomputed. Second, the squaring step as a composition of two vector fields is basically computable with a dense warping function. A differentiable linear interpolation, such as used in spatial transformer networks, may be applied for the squaring step. Taking the velocities as input, the exponentiation layer 26 outputs the corresponding displacements, which are diffeomorphic. While the layer 26 is fully differentiable, the layer 26 does not contain any trainable weights. Other approaches to implement the exponentiation function may be used, such as including a trainable weight. Other integration layers than a scaling and squaring may be used.

In FIG. 2, the architecture is defined to include another layer and corresponding output. The warping layer 27 outputs a warped image from the input of the displacements and one of the input images $I_t$. The warping layer 27 may be modeled as a dense spatial transformer with differentiable linear interpolation. Other modeling for spatially transforming the moving image using the displacements $u_t$ may be used. The warping is a non-rigid transformation of the image, altering the pixel or voxel values based on the displacements.

FIG. 3 does not include the warping layer 27 but may include the warping layer 27 in other embodiments. Additional, different, and/or fewer output layers and corresponding outputs may be provided. In the supervised case of FIG. 3, ground truth deformation fields are used for training. Other ground truths may be used, such as warped images and/or velocity fields. The output of the network are the velocities and the deformation field, which is guaranteed to be diffeomorphic due to the exponentiation layer 26 even if the provided training deformation fields are not diffeomorphic.

In act 14, a machine (e.g., image processor) trains the defined neural network arrangement. The training data (i.e., pairs of images) are used to train the neural network to determine a diffeomorphic deformation field. Given pairs of images, the network is trained by the training data to estimate the displacements between later input unseen images. Other outputs may be trained, such as training to estimate a velocity field and/or warped image. The network may be trained to estimate combinations of outputs, such as outputting velocities, displacements, and a warped image (i.e., one of the input images adjusted by the displacements).

The diffeomorphic neural network learns registration purely from data. Rather than using a manually programmed algorithm, the network is trained to estimate based on the samples in the training data (i.e., image pairs). In the supervised learning, a similarity metric is learned. The training data includes a ground truth deformation field for each pair of images. The similarity of the estimated displacements to the ground truth displacements across the many samples is minimized. For example, the neural network is trained as a standard regression problem with the sum-of-squared differences loss between prediction and ground truth deformation field, as represented by:

$$\mathcal{L}_t(u_i^{GT}, u_i) = \frac{1}{n}\sum_x (u_t^{GT}(x) - u_t(x))^2$$

Other loss functions, such as L1 or L2, may be used. Any optimization may be used, such as Adam, RMSprop optimizer, or SGD. Batch normalization, dropout, and data augmentation are not used, but may be. During the optimization, the different distinguishing features are learned. The features providing an indication of deformation given input medical images are learned.

In the example of FIG. 3, the trained outputs of the network are the velocities and the deformation field, which is guaranteed to be diffeomorphic due to the proposed exponentiation layer 26 even if the provided training deformation fields are not diffeomorphic.

In the unsupervised case, a pre-defined similarity metric is used. The defined network is trained to optimize one or multiple losses: a predefined similarity metric and possibly a regularizer on the velocities and/or deformation field. The need for hand-crafted regularization criteria is minimized due to the architecture of the network, so a regularizer may not be used in other embodiments. Any differentiable similarity metric and regularizer and its combinations may be used as weighted loss functions during training the unsupervised framework. Example metrics for deep learning-based registration include sum of squared differences, normalized cross correlation, structural similarity, or deformation gradient penalization. In other embodiments, differentiable versions of: local cross correlation represented as:

$$\mathcal{D}_{LCC}(I_{t+1}, I_t^*) = \frac{\overline{I_{t+1} \circ \exp\left(-\frac{v}{2}\right) I_t^* \circ \exp\left(\frac{v}{2}\right)}}{\sqrt{\left[I_{t+1} \circ \exp\left(-\frac{v}{2}\right)\right]^2 \left[I_{t^*} \circ \exp\left(\frac{v}{2}\right)\right]^2}},$$

structural similarity represented as:

$$SSIM(I_{t+1}, I_t^*) = \frac{(2\mu_{I_{t+1}}\mu_{I_t^*})(2\sigma_{I_{t+1}I_t^*} + c_2)}{(\mu_{I_{t+1}}^2 + \mu_{I_t^*}^2 + c_1)(\sigma_{I_{t+1}}^2 + \sigma_{I_t^*}^2 + c_2)},$$

Tukey biweight function, mutual information, metric learning, velocity magnitude penalization, or Gaussian smoothing may be used. The local cross correlation, which requires convolution with Gaussian kernels, may be efficiently implemented with the optimized convolution operators in deep learning frameworks.

For training, one of the input images may be fed to the warping layer 27 to be warped (see FIG. 2). For example, the moving image $I_{t+1}$ is warped to match the fixed image $I_t$. The resulting warped image is compared to the other input image. The comparison uses the predefined similarity metric. In training, optimization is performed to minimize or maximize the similarity metric. The network is trained using any differentiable similarity metric of the images of the pairs.

The proposed frameworks or networks are generalizable as the networks may learn diffeomorphic deformable registration for different kinds of data. The network may be trained for computed tomography, magnetic resonance, ultrasound, x-ray, positron emission tomography, single photon emission computed tomography, or combinations thereof. The network may be trained for images of any anatomy or patient region. For a new use case or new data, the network is retrained, trained from scratch, or fine-tuned on the new data.

In one embodiment, the registration is modeled probabilistically by parametrizing the deformation as a vector z to follow a prior p(z). To learn this probabilistic space, the latent vector of dimensionality d in an encoder-decoder neural network is defined as this z. Given the moving and the fixed images as input, a variational inference method is used to reconstruct the fixed image by warping the moving image. An exponentiation layer interprets the network's output as velocities v (an SVF) and returns a diffeomorphism, which is used by a dense STN to retrieve the warped image. To enforce an user-adjustable level of deformation smoothness, a convolutional Gaussian layer is added before the exponentiation with Gaussian weights according to the variance $\sigma^2_s$. During training, the network parameters are updated through back-propagation of the gradients. The registration is performed in a single forward path. The trained probabilistic framework may be also used for the sampling of deformations.

For learning a probabilistic deformation encoding, the prior is defined as multivariate unit Gaussians p(z)=N(0; I) with the identity matrix I. The encoder $q_\omega$ and decoder p distributions are additionally conditioned on extra information (e.g. classes). The frame image registration is treated as a reconstruction problem in which the moving image acts as the conditioning data and is warped to reconstruct or to match the fixed image. Thus, the decoder reconstructs given z and the moving image. To have z, the encoder serves as an approximation of the intractable true posterior probability of z given the images. Since the prior p(z) is defined as multivariate unit Gaussians, the encoder network predicts the mean and diagonal covariance, from which z is drawn.

Both distributions may be combined in a two-term loss function where the first term describes the reconstruction loss as the expected negative log-likelihood. In other words, the reconstruction loss represents a similarity metric between input and output. The second term acts as a regularization term on the deformation latent space by forcing the encoded distribution to be close to the prior probability distribution using a Kullback-Leibler (KL) divergence. The KL-divergence may be computed in closed form. Assuming a Gaussian log-likelihood term of p is equivalent to minimizing a weighted SSD criterion, a symmetric local cross-correlation (LCC) criterion may be used due to favorable properties for registration, and a LCC Boltzmann distribution may be assumed with the LCC criterion and a weighting factor. To help the reconstruction task, conditioning is performed by involving the moving image not only as the image to be warped in the STN but also in the first decoder layers by concatenating down-sampled versions of the moving image with the filter maps on each scale in a multi-scale approach. The hypothesis is that in order to better optimize the reconstruction loss, the network makes use of the provided extra information of the moving image such that less anatomical but more deformation information are conveyed by the low-dimensional latent layer, which would make the encoding more geometry-invariant.

In the exponentiation layer, diffeomorphisms are generated. In the SVF setting, the transformation is defined as the Lie group exponential map with respect to the velocities. For efficient computation, the scaling and squaring algorithm is used. In order to generate diffeomorphic transformations in a neural network, the exponentiation layer implements scale and squaring in a fully differentiable way. To this end, the layer expects a vector field as input (the velocities v), which is scaled with the precomputed factor N. N is precomputed on a subset of the training data. In the squaring step, the approximated function is recursively squared, N-times, from k=1 to N. The result is the diffeomorphism. The squaring step requires the composition of two vector fields on regular grids, which may be realized by linear interpolation. All these computations are operations that may be added to the computational graph and are auto-differentiable in deep learning libraries. This differentiable layer may be added to any neural network, which predicts (stationary) velocity fields.

While supervised and unsupervised examples are provided, other training, such as semi-supervised training, may be used. The defined architectures or frameworks may be combined. Both the ground truth and predefined similarity metric are used, such as in a weighted summation loss function. This semi-supervised network relies on both given ground-truth deformation fields and on a pre-defined similarity metric. This approach is especially helpful in case of only a few or strongly approximated ground-truth deformation fields.

Figure 4:
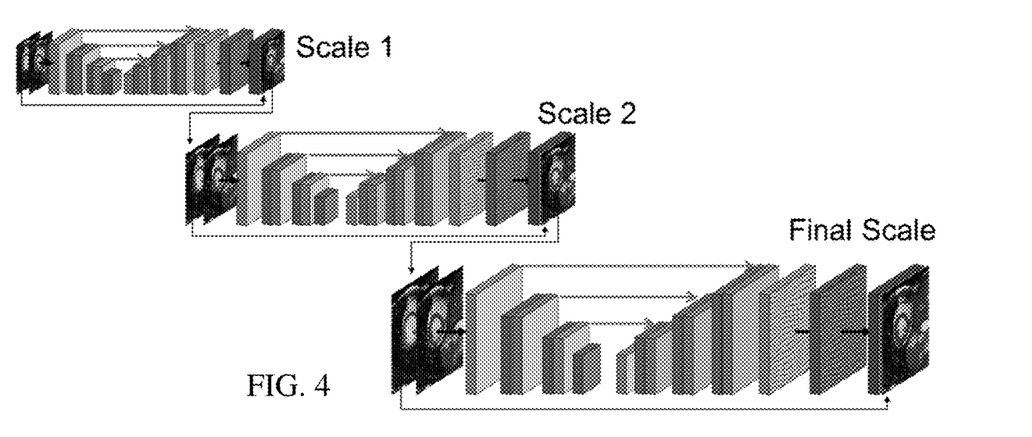
FIG. 4 illustrates an example multi-scale neural network architecture for diffeomorphic registration.

FIG. 4 shows another embodiment of a network to be trained. For supervised, unsupervised, or semi-supervised training, a multi-scale network is defined and trained. A consecutive multi-scale architecture implements coarse-to-fine deformation estimations where the output warped image of the coarser scales are the inputs to the finer scales. In the example of FIG. 4, the network of FIG. 2 is repeated at three different scales each with a given difference ratio in scale, such as ½ or 2. Additional, different, or fewer scales may be provided. Different ratios of scales may be used. The training is performed separately for each scale, or end-to-end training is used to train the entire network (network at each scale) at once or in a given optimization. Using the multi-scale arrangement or framework may be more robust to noise compared to a one-scale approach.

In act 16, the machine outputs a trained neural network. The machine-learned network incorporates the deep learned features for the various units and/or layers of the network. The collection of individual features forms a feature or feature set for estimating deformation between two images. The features are provided as nodes of the feature units in different levels of abstraction or compression. The nodes define convolution kernels trained to extract the features.

Once trained, a matrix, kernels, or other trained network is output. The data represents the trained architecture. The machine-learned network includes definitions of convolution kernels and/or other characteristics of the neural network trained to determine diffeomorphic displacements. Alternatively, separate matrices or network representations are used for any of the nodes, units, layers, network, and/or registration.

The machine-learned detector is output to a network or memory. For example, the neural network as trained is stored in a memory for transfer and/or later application.

Using the learned features, the machine-learned network may detect the velocities, displacements, and/or warped image in response to input of a pair of images, such as medical images for a patient. Once the network is trained, the network may be applied. The network with defined or learned features is used to extract from input images. The machine-learned network uses the extracted features from the images to estimate the diffeomorphic displacements.

FIG. 5 is a flow chart diagram of one embodiment of a method for registration with a medical imaging system. The machine-learned network is applied to determine diffeomorphic deformation between two input images.

Figure 7:
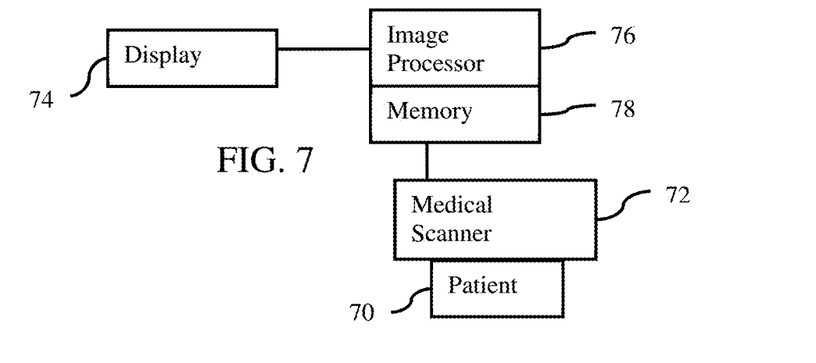
FIG. 7 is a block diagram of one embodiment of a system for registration.

The same image processor or a different image processor than used for training applies the learned features and network. For example, the network architecture, learned weights, learned connections, and/or learned kernels are transmitted from a graphics processing unit used to train to a medical scanner, medical server, or medical workstation. An image processor of the medical imaging system applies the machine-learned network. For example, the medical imaging system of FIG. 7 is used.

Additional, different, or fewer acts may be provided. For example, acts for configuring the medical system are provided. The acts are performed in the order shown (top to bottom or numerical), but other orders may be used.

In act 52, the image processor acquires a pair of images of a patient. The images are from a scan of a patient, so may be sets or frames of scan data from any stage of image formation. For example, an MR imaging system or systems scan the patient (e.g., torso, cardiac or heart scan) at different times. The resulting scan data is acquired from or by the MR system or systems. As another example, different imaging systems or modalities scan the patient. The different systems or modalities acquire scan data.

The acquisition is by scanning the patient. Alternatively, the acquisition is by receiving from a network interface from a scan performed remotely. In other embodiments, acquisition is by loading from memory from a previously performed scan.

The received medical images are to be used to determine the deformation between the sets of scan data. The displacements between two images may represent a change in a tumor or anatomy over time. The displacements may be used to align anatomy from different scans or modalities. The received medical images may be pre-processed, such as normalized in a same way as the training medical images.

In act 54, the medical imaging system or image processor determines the diffeomorphic displacements between the acquired images. For example, the machine-learned network is applied to determine velocities, displacements, and/or a warped image. The displacements are detected using the hidden features of the deep network. The trained convolution units and diffeomorphic units are applied to the scan data or derived feature values to extract the corresponding features and output the displacements. The features of the input images are extracted from the images. Other more abstract features may be extracted from those extracted features using the architecture. Depending on the number and/or arrangement of units, other features are extracted from features.

In one embodiment, a velocity field is generated using the features. The sets of scan data are input to the deep machine-learned network, such as inputting to the encoder of a fully convolutional encoder-decoder network. The fully convolutional encoder-decoder network outputs velocities by location. A following diffeomorphic layer or unit of the deep machine-learned network outputs displacements that are diffeomorphic from the estimated velocities. Diffeomorphic displacements of the registration of the sets of scan data are generated from the velocities using the exponentiation layer or unit, which integrates the velocities using scale and square or other operations. A warping layer or unit may form a warped image from the displacements.

In a multi-scale approach, a sequence of such networks at different scales are used. The warped image output from one coarser scale is used as input to a next finer scale. The network at each level outputs velocities, displacements, and/or warped images, any of which may be used for input or to form input to another scale. The other image of the pair at each scale is the same image down sampled or filtered to be at the appropriate scale. The warped image may be up sampled or interpolated to the next scale.

The network being applied has been trained in supervised, semi-supervised, or unsupervised machine deep learning. The type of training (e.g., using ground truth deformations and/or a predefined similarity metric with or without a regularizer) may result in different kernels, weights, and/or connections in the network being applied. For unsupervised or semi-supervised learning, the resulting network being applied may be different based on the differentiable similarity metric that was used in the training. The displacements are diffeomorphic but may be different depending on the type of similarity metric, training data, network architecture, and/or type of training.

The trained neural network is configured by the machine training to output a velocity field, deformation field, and/or warped image at a resolution of the medical images or scan data. For example, the neural network outputs a displacement vector (magnitude and direction) for each pixel or voxel of the scan data. The velocity field, deformation field, and/or warped image may be at a different resolution than the input images.

In act 56, the medical imaging system or image processor generates an image of the patient from the displacements. The image is output. The estimated results (e.g., velocity field or deformation field) or registered images are output.

In one embodiment, the warped image is output. The warped image is displayed with an image of the same region of the patient from a different time and/or modality. The registration represented in the warped image may allow for more diagnostically useful comparison of the images from different times and/or modalities. The registration or spatial transformation of the displacements may be used for segmentation or surgery planning where one or more images showing segmentation or the surgery plan are output. In yet other embodiments, an image is displayed with an annotation of a quantity (e.g., area, length, or volume) calculated based, at least in part, on the displacements, such as calculating a change in volume from a warped image from one time and an image from another time in a longitudinal study. The calculation of the quantity relies on the location of anatomy at different times. The medical imaging system or image processor calculates the quantity using the registration.

For application or testing of the machine-learned diffeomorphic registration network, the network may register in tens of milliseconds for pair-wise dense deformation estimations whereas variatonal state-of-the-art methods may require minutes or hours. The image processor operates more efficiently or quickly using the trained network. Compared to other deep-learning based registration, the outputs are guaranteed to be diffeomorphic due to the diffeomorphic layer included in the network architecture. Robustness and accuracy may be provided from the multi-scale approach and the data.

In one embodiment, the encoder of the neural network has four convolutional layers with strides (2, 2, 2, 1). The bottleneck layers are fully-connected. The decoder has one fully-connected and three deconvolutional layers, where the outputs at each layer are concatenated with sub-sampled versions of the moving image. Two convolutional layers and a convolutional Gaussian layer with S=3 (kernel size 15) are placed in front of the exponentiation and transformer (warping) layers. The latent code size d is set to 16 as a trade of between registration quality and generalizability. This leads to a total of about 267k trainable parameters. L2 weight decay with a factor of 0.0001 is applied in training. The numbers of iterations in the exponentiation layer is set to N=4. In training, the strength of the Gaussians for computing the LCC is set to $\sigma_G=2$ with a kernel size k=9. The loss balancing factor $\lambda=5000$ is empirically chosen such that encoded training samples roughly have zero means and variances of 1 and the reconstruction loss is optimized. The Adam optimizer is used with a learning rate of 0.0005 and a batch size of one. Online data augmentation may be performed by randomly shifting, rotating, scaling and mirroring training images. The framework may be implemented using Keras with Tensorow. Training may take 24 hours on a NVIDIA GTX TITAN X GPU.

Figure 6:
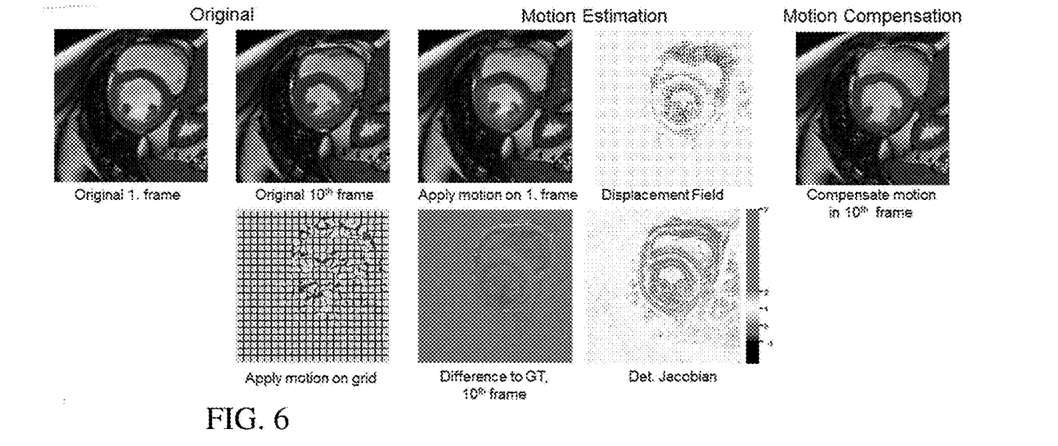
FIG. 6 shows example images related to deformable registration with a deep-learned network.

FIG. 6 shows an example application using the network of FIG. 2 (unsupervised training). The unsupervised framework is trained with the loss of mean of squared differences and regularizer of velocities magnitude penalization. The training data is from pairs of images for cardiac MR cine. The images show registration of frame 1 to frame 10 by composition of the individual pair-wise registrations. The motion estimation is shown by velocities applied to frame 1 and a displacement field estimated by the network. The motion compensation is a deformed or warped image for frame 10. The displacements may be represented by a grid. The difference of the warped image to the ground truth is shown. The determinant Jacobian for the diffeomorphic displacements is shown to indicate that the displacements are diffeomorphic.

Different trained networks are tested. The performance of the networks is shown using numerical results in cardiac sequences, registering one frame of a sequence to all other frames via composition of the pair-wise deformation fields (similarity metric is mean of squared differences). Table 1 shows the differences in performance.

The single scale with magnitude penalization is trained with mean of squared differences while the single scale with magnitude penalization marked with "*" is trained with structural similarity loss. The magnitude penalization is a regularizer. The multi-scale experiment is without any further regularization. The root mean square error (RMSE) shows how well two images are aligned or spatially registered. The determinant Jacobian being above 0 shows the displacements as diffeomorphic. Using three scales or the single scale approaches provide the best error minimization while also providing diffeomorphic displacements.

FIG. 7 shows a medical imaging system for image registration. The medical imaging system is a host computer, control station, workstation, server, medical diagnostic imaging scanner 72, or other arrangement used for training and/or application of a machine-learned network to medical images.

The medical imaging system includes the display 74, memory 78, and image processor 76. The display 74, image processor 76, and memory 78 may be part of the medical scanner 72, a computer, server, or other system for image processing medical images from scans of a patient. A workstation or computer without the medical scanner 72 may be used as the medical imaging system. Additional, different, or fewer components may be provided, such as including a computer network for remote registration of locally captured scans or for local registration from remotely captured scans.

The medical imaging system is for training, such as using images from the memory 78 and/or medical scanner 72 as training data. Alternatively, the medical imaging system is for application of the machine-learned network trained with the deep learning in a neural network architecture including a diffeomorphic layer.

The medical scanner 72 is a medical diagnostic magnetic resonance (MR) imaging system. A main magnet or coil generates a substantially uniform magnetic field through the patient 70. Gradient coils, local coils, and/or a whole-body coil generate a pulse sequence to shift spin axes of molecules in the patient away from the uniform magnetic field lines. The local coils and/or whole-body coil detect radio frequency emissions caused by the relaxation of the spin axes of the molecules returning to the magnetic field lines. This k-space data is reconstructed into an object or spatial domain using Fourier processing. The resulting scan data represents the cardiac or other region of the patient. The pulse sequence may be repeated in order to obtain scan data representing the

TABLE 1

|  | RMSE (on intensities) | | | | Determinant Jacobian | | | | |
| --- | --- | --- | --- | --- | --- | --- | --- | --- | --- |
|  | Mean | Median | Std. | 95% | Mean | Median | Std. | 95% | <0 (%) |
| MultiScale (coarsest) | .0229 | .0036 | .0536 | .0461 | 1.0027 | 0.9914 | 0.2248 | 1.3515 | 0.0 |
| MultiScale 2 Scales | .0213 | .0050 | .0544 | .0417 | 1.0021 | 0.9394 | 0.6522 | 1.9011 | 0.1519 |
| MultiScale 3 scales | .0155 | .0033 | .0450 | .0289 | 0.9974 | 0.8378 | 1.0710 | 2.5194 | 1.8603 |
| SingleScale with mag. penalization | .0180 | .0043 | .0430 | .0370 | 0.9990 | 0.9958 | 0.4614 | 1.4892 | 0.1072 |
| SingleScale* with mag. penalization | .0169 | .0041 | .0453 | .0323 | 1.0784 | 0.8659 | 1.5347 | 2.4451 | 0.9065 | cardiac region at a different time. Any MR cardiac imaging pulse sequence or scanning may be used.

Other medical scanners may be used instead of the MR scanner or in a multi-modality registration. Other modalities include ultrasound, computed tomography, positron emission tomography, x-ray, angiography, fluoroscopy, or single photon emission computed tomography.

The medical scanner 72 is configured by default, stored, input, or other settings to generate an image from a scan of the patient. A frame (set) of data representing two or three-dimensional region of the patient is generated. The frame includes scalar values or display (e.g., RGB) values. The other image may likewise be acquired by scanning. Alternatively, one or both images are acquired from network transfer and/or memory 78.

The images are acquired as part of any application including deformable image registration. For example, a registration application is provided as part of radiation therapy imaging, motion compensation during reconstruction (e.g., multi-modality CT and PET or SPECT), a pharmaco-kinetic study (e.g., MR-based study), or for image guided therapy.

The image processor 76 is a control processor, general processor, digital signal processor, three-dimensional data processor, graphics processing unit, application specific integrated circuit, field programmable gate array, artificial intelligence accelerator or processor, digital circuit, analog circuit, combinations thereof, or other now known or later developed device for processing medical image data. The image processor 76 is a single device, a plurality of devices, or a network of devices. For more than one device, parallel or sequential division of processing may be used. Different devices making up the image processor 76 may perform different functions. In one embodiment, the image processor 76 is a control processor or other processor of a medical diagnostic imaging system, such as the medical scanner 72. The image processor 76 operates pursuant to stored instructions, hardware, and/or firmware to perform various acts described herein, such as controlling scanning, estimating displacements, registering images, and/or generating an output image based on diffeomorphic displacements.

The image processor 76 is configured to train a deep architecture. Based on a user provided or other source of the network architecture and training data, the image processor 76 learns features for an encoder and a decoder to train the network. The network architecture includes a diffeomorphic layer, which contributes to the training. The result of the training is a machine-learned network for registration based on the neural network architecture including the diffeomorphic layer.

Alternatively or additionally, the image processor 76 is configured to apply a machine-learned neural network to a pair of images for a patient. The machine-learned neural network was trained to generate a warped image using velocities estimated from the input images and using a diffeomorphic deformation field determined from the velocities. The warped image is generated in a single forward evaluation of the network, so the registration is performed in a second or less.

The image processor 76 applies the machine-learned neural network, which includes an encoder-decoder network having been trained to estimate the velocities and an exponentiation layer configured to generate the diffeomorphic deformation field from the velocities. The machine-learned neural network may also include a warping layer configured to generate the warped image from the diffeomorphic deformation field. Alternatively, a warping function is applied outside the network using the deformation field output by the network, or warping is not used. The network may be a multi-scale or single scale network. The network may have been trained with unsupervised learning using a pre-training defined similarity metric or with supervised learning using ground truth warped image or deformation field.

The image processor 76 may be configured to output an image based on the deformation field. The deformation field is used in any registration application, and the resulting images from the registration are output. The output image may be the warped image or an image derived from the warped image. Other images may be output, such as spatially aligned images based on the registration or transformation. An image of the patient including one or more quantities calculated based on the registration may be output.

The display 74 is a CRT, LCD, projector, plasma, printer, tablet, smart phone or other now known or later developed display device for displaying the output, such as a warped image or other image based on the registration.

The instructions, medical images, network definition, features, machine-learned network, outputs, and/or other information are stored in a non-transitory computer readable memory, such as the memory 78. The memory 78 is an external storage device, RAM, ROM, database, and/or a local memory (e.g., solid state drive or hard drive). The same or different non-transitory computer readable media may be used for the instructions and other data. The memory 78 may be implemented using a database management system (DBMS) and residing on a memory, such as a hard disk, RAM, or removable media. Alternatively, the memory 78 is internal to the processor 76 (e.g. cache).

The instructions for implementing the training or application processes, the methods, and/or the techniques discussed herein are provided on non-transitory computer-readable storage media or memories, such as a cache, buffer, RAM, removable media, hard drive or other computer readable storage media (e.g., the memory 78). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for registration with a medical imaging system, the method comprising:
    acquiring first and second sets of scan data representing a patient;
    determining displacements of the registration of the scan data of the first set with the scan data of the second set, the displacements being determined by input of the first and second sets of the scan data to a deep machine-learned network, the deep machine-learned network having a plurality of first layers outputting velocities in response to the input and having a second layer outputting the displacements in response to the velocities from the first layers, the second layer being a diffeomorphic layer such that the displacements output by the deep machine-learned network are diffeomorphic; and
    generating an image of the patient from the displacements.

2. The method of claim 1 wherein acquiring comprises scanning the patient with different modalities and/or at different times.

3. The method of claim 1 wherein determining comprises determining with the diffeomorphic layer of the deep machine-learned network comprising an integration layer configured to integrate velocities, the integration layer separate from the first layers.

4. The method of claim 3 wherein determining comprises determining with the integration layer configured to exponentiate the velocities through scaling and squaring.

5. The method of claim 1 wherein determining comprises determining with the deep machine-learned network comprising a fully convolutional encoder-decoder network formed by the first layers, the fully convolutional encoder-decoder network having been trained to output the velocities by location from the scan data of the first and second sets and the diffeomorphic layer following the first layers of the fully convolutional encoder-decoder network configured to receive the velocities and output the displacements from the velocities.

6. The method of claim 1 wherein generating the image comprises generating a warped image from the determined displacements.

7. The method of claim 1 wherein determining comprises determining with the deep machine-learned network comprising a sequence of two or more diffeomorphic networks at different scales.

8. The method of claim 1 wherein determining comprises determining with the deep machine-learned network having been trained with ground truth deformations in supervised learning.

9. The method of claim 1 wherein determining comprises determining with the deep machine-learned network having been trained with a similarity metric in unsupervised learning.

10. The method of claim 9 wherein determining comprises determining with the deep machine-learned network having been trained with the similarity metric and a regularizer.

11. The method of claim 9 wherein determining comprises determining with the deep machine-learned network having been trained with the similarity metric comprising a differentiable metric.

12. A medical imaging system for image registration, the medical imaging system comprising:
    a medical scanner configured to generate a first image from a scan a patient;
    an image processor configured to apply a machine-learned neural network to the first image and a second image, the machine-learned neural network having been trained to generate, by a network architecture being trained to become the machine-learned neural network, a warped image using velocities estimated from the first and second images with generation of the velocities by the network architecture and trained using a diffeomorphic deformation field determined from the velocities by the network architecture; and
    a display configured to display the warped image or an image of the velocities.

13. The medical imaging system of claim 12 wherein the machine-learned neural network generates the warped image in a single forward evaluation.

14. The medical imaging system of claim 12 wherein the machine-learned neural network comprises an encoder-decoder network having been trained to estimate the velocities and an integration layer configured to generate the diffeomorphic deformation field from the velocities.

15. The medical imaging system of claim 14 wherein the machine-learned neural network further comprises a warping layer configured to generate the warped image from the diffeomorphic deformation field.

16. The medical imaging system of claim 12 wherein the machine-learned neural network comprises a multi-scale network.

17. The medical imaging system of claim 12 wherein the machine-learned neural network was trained with unsupervised learning using a pre-training defined similarity metric.

* * * * *